United States Patent [19]
Daines

[11] 3,830,114
[45] Aug. 20, 1974

[54] CHAIN TENSIONER
[75] Inventor: Derrick Arthur Daines, Loudun, France
[73] Assignee: Rotary Hoes Limited, West Horndon, Essex, England
[22] Filed: Jan. 2, 1973
[21] Appl. No.: 320,298

[30] Foreign Application Priority Data
Jan. 8, 1972 Great Britain ...................... 963/72

[52] U.S. Cl. ......................................... 74/242.11 S
[51] Int. Cl. ............................................. F16h 7/12
[58] Field of Search .................... 74/242.8, 242.11 S

[56] References Cited
UNITED STATES PATENTS
2,893,255   7/1959   Bayliss .............................. 74/242.8
2,963,918   12/1960  Blakstad ........................... 74/242.8
3,081,643   3/1963   Huboi et al. ................... 74/242.11 S
3,117,463   1/1964   Brindle ......................... 74/242.11 S Primary Examiner—Leonard H. Gerin
Attorney, Agent, or Firm—Hofgren, Wegner, Allen, Stellman & McCord

[57] ABSTRACT

A chain tensioner for drive transmission chains has an arm which engages and tensions the chain. The arm is supported on a movable support and the support is biased to move the arm upon decrease in tension in the chain. The arm is movable through a series of positions, the position adopted depending on the inherent slackness of the chain.

6 Claims, 1 Drawing Figure

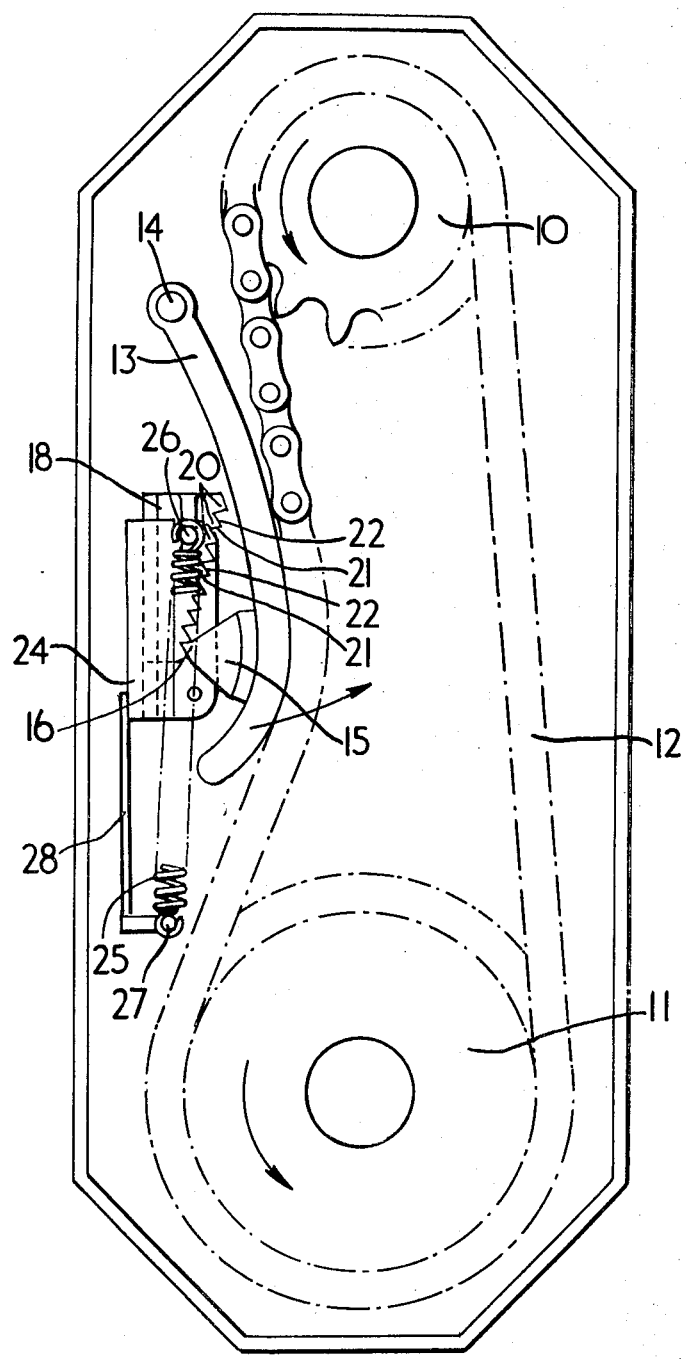

CHAIN TENSIONER

This invention relates to chain tensioners particularly for use in maintaining the desired tension in drive transmission chains. The invention may also find application in maintaining tension in drive transmission belts, for example, V-belts or other drive transmission members in which the tension should be maintained at an optimum value to give the most advantageous driving characteristics. In this specification reference to chain should be understood to include belts and like drive transmission members.

An object of the invention is to provide a relatively simple chain tensioning arrangement by which tension in a chain can be readily and automatically maintained at the desired value.

According to the invention a chain tensioner for drive transmission chains comprises a chain-engaging member arranged to be movable to engage the transmission chain to tension the chain, a support member for supporting the chain-engaging member in one of a plurality of positions relative to the chain, and biasing means for biasing the chain-engaging member towards one of said positions which positions are arranged to provide a progressively increasing tensioning effect on the chain.

Preferably the chain-engaging member and the support member are provided with interengaging elements engageable in said positions and relatively movable between one position and another under the action of the biasing means.

The interengaging elements may be in the form of a tooth formed on the chain-engaging member and a series of teeth on the support member, the tooth being engageable selectively with one of the series of teeth to locate the chain-engaging member in one of said positions.

In the series of teeth each tooth may have two surfaces angled with respect to the direction of movement of the chain-engaging member so that, under the action of the biasing means, the tooth of the chain engaging member is movable over the tooth surfaces in moving between said positions.

Conveniently the support member is movable in a direction generally at a right angle to the direction of movement of the part of the chain-engaging member which engages the chain and the support member is biased by the biasing means to move in this direction so as to urge the chain-engaging member to move in a direction to tension the chain.

The teeth may each have two groups of surfaces, one group being arranged to be generally parallel to the direction of movement of the part of the movable member which engages the chain and the other group of surfaces being at slightly more than a right angle to the first-mentioned group, and the surfaces in one group alternating with the surfaces in the other group.

Conveniently the chain-engaging member is mounted for pivotal movement towards a position in which the chain is tensioned and the support member is mounted for movement generally radially of the pivot axis of the chain-engaging member. The biasing means may be arranged to urge the support member in a direction away from the pivot axis of the chain-engaging member.

The movable member may include a curved arm having a portion on the outside of the curve arranged to bear on the chain.

Further preferred features of the invention appear from the following description of an embodiment of the invention given by way of example and with reference to the drawing which is a side elevation of a chain tensioner.

Referring to the drawing a chian drive arrangement includes a drive sprocket 10 and a driven sprocket 11 around which sprockets passes a transmission chain 12. The illustrated arrangement is intended particularly for transmistting drive in a rotary cultivating machine, and in such an arrangement the sprocket 10 is in driving engagement with a shaft to be driven by the power take-off of a tractor and the sprocket 11 is carried on a rotor shaft to which rotary cultivating tools are secured. However it will be appreciated that the invention can be applied to chain drive arrangements for other machines.

In order to tension the chain 12 and to take up any slackness developing in the chain in use, a chain tensioning arrangement includes a pivotable curved arm 13 pivotally supported at 14 and the arm at the outside of the curve is arranged to bear on the chain 12 to tension the chain.

To the inside curve of the arm 13 is secured a locking member 15 whose end remote from the arm 13 is formed as a tooth 16. A support member 18 is formed with a series of teeth 20, the tooth 16 and the teeth 20 constituting interengaging tooth elements. The teeth 20 have surfaces 21 and surfaces 22 alternating to constitute a stepped series of teeth, and the surfaces 22 are each at an acute angle to radii from the axis of pivoting of the arm 13, the surfaces 21 being at slightly less than a right angle to the adjacent surface 22 nearest the axis 14.

The support member 18 is movable in guides 24 between the position illustrated in the drawing and a position at the end of the guides remote from the pivot axis 14. A spring 25 constituting biasing means is attached through a pin 26 to the member 18 at one end and at the opposite end to a pin 27 so as to bias the member 18 in a direction away from the pivot axis 14. The pin 27 is carried on an extension 28 secured to the guides 24.

In operation the arm 13 engages the chain 12 to maintain tension in the chain at the desired level, and the arm is automatically adjusted by the tensioning arrangement to compensate for any change in tension in the chain brought about, for example, by stretching of the chain.

Owing to the inclination of the tooth surfaces 21 relative to the pivot axis 14 and the biasing action of the spring 25, any reduction in tension of the chain 12 below a predetermined level causes the arm 13 to pivot about the axis 14 so that the tooth 16 slides over the surface 21 of the respective tooth 20. When movement of the arm is sufficiently great that the tooth 16 moves to the edge of the surface 21, the tooth 16 moves to engage the next successive surface 21 and the member 18 moves away from the axis 14 under the action of the spring 25. In this way movement of the arm 13 continues, achieving a progressively increasing tensioning effect until the predetermined level of tension in the chain is achieved.

It will be appreciated that the strength of the spring 25 and the inclination of the surfaces 21 and 22 will be selected having regard to the desired tension in the chain.

What I claim as my invention and desire to secure by Letters Patent of the United States is:

1. A chain tensioner for drive transmission chains comprising a pivotal chain-engaging member arranged to engage the transmission chain to tension the chain, a support member for supporting the chain-engaging member in one of a plurality of positions relative to the chain, a guide member for guiding the support member for linear movement relative to the guide member, and biasing means for biasing the support member to move along the guide means in a direction to bias the chain-engaging member towards the chain, the support member and the chain-engaging member having interengaging teeth engageable in said positions, the teeth on the support member being stepped to provide a progressively increasing tensioning of the chain by the chain-engaging member under the action of the biasing means.

2. A chain tensioner according to claim 1 wherein the biasing means is arranged to urge the support member in a direction radially of and away from the pivot axis of the chain-engaging member.

3. A chain tensioner according to claim 1 wherein the chain-engaging member is formed with a single tooth which engages with one of the teeth of the support member in each of said positions.

4. A chain tensioner according to claim 3 wherein the teeth on the support member each have two surfaces angled with respect to the direction of movement of the chain-engaging member so that the tooth of the chain-engaging member is movable over the tooth surface in moving between said positions.

5. A chain tensioner according to claim 1 wherein the teeth on the support member are stepped so as to lie generally along a line diverging from the line of movement of the support member relative to guide means.

6. A chain tensioner according to claim 1 wherein the chain-engaging member is movable in a direction generally at a right angle to the movement of the support member relative to the guide member.

* * * * *